United States Patent
Tanaka et al.

(10) Patent No.: US 11,462,137 B2
(45) Date of Patent: Oct. 4, 2022

(54) DESIGNED SIGN SYSTEM

(71) Applicant: DAIKAN CO., LTD., Osaka (JP)

(72) Inventors: Atsuyoshi Tanaka, Osaka (JP); Osamu Jingi, Osaka (JP)

(73) Assignee: DAIKAN CO., LTD., Osaka (JP)

(*) Notice: Subject to any disclaimer, the term of this patent is extended or adjusted under 35 U.S.C. 154(b) by 0 days.

(21) Appl. No.: 17/045,920

(22) PCT Filed: Aug. 20, 2018

(86) PCT No.: PCT/JP2018/030711
§ 371 (c)(1),
(2) Date: Oct. 30, 2020

(87) PCT Pub. No.: WO2019/159396
PCT Pub. Date: Aug. 22, 2019

(65) Prior Publication Data
US 2021/0125530 A1    Apr. 29, 2021

(30) Foreign Application Priority Data

Feb. 14, 2018 (JP) .............................. JP2018-023942

(51) Int. Cl.
*G09F 19/18* (2006.01)
*G03B 21/62* (2014.01)
*G09F 13/02* (2006.01)

(52) U.S. Cl.
CPC ............. *G09F 19/18* (2013.01); *G03B 21/62* (2013.01); *G09F 13/02* (2013.01)

(58) Field of Classification Search
CPC ........ G03B 21/56; G03B 21/60; G03B 21/62; G03B 21/12; G09F 19/18; G09F 13/02;
(Continued)

(56) References Cited

U.S. PATENT DOCUMENTS 3,090,280 A * 5/1963 Winter, Jr. .......... G09F 15/0006
353/28
4,076,398 A * 2/1978 Galbraith ............... G03B 21/00
353/121
(Continued)

FOREIGN PATENT DOCUMENTS

JP    H05289622 A    11/1993
JP    2000-132120 A    5/2000
(Continued)

OTHER PUBLICATIONS

International Search Report and Written Opinion, International Patent Application No. PCT/JP2018/030711, dated Sep. 18, 2018, with English translation (17 pages).

*Primary Examiner* — Cassandra Davis
(74) *Attorney, Agent, or Firm* — Hamre, Schumann, Mueller & Larson, P.C.

(57) ABSTRACT

A designed sign system 101 including: an image projector 2 for projecting an image constituted of a still image and/or a dynamic video; a projection screen body 1a for displaying recognizably by reflecting a projected image from the image projector 2; and a design part 10 formed into a shape displaying a character, a figure, or a pattern by partially providing on a projection surface side of the projection screen body 1a; wherein the design part 10 has a translucent layer 10a that diffuse reflecting a part of light received on a front surface side and transmits a remaining part, and has an opaque layer 10b that reflects remaining light transmitted on the back surface side. Thus, a designed sign system that can produce luxury feeling and has high designability may be provided.

5 Claims, 7 Drawing Sheets

(58) Field of Classification Search
CPC ............ G09F 13/18; G09F 2013/1859; G09F 2013/1854
See application file for complete search history.

(56) References Cited

U.S. PATENT DOCUMENTS

2008/0012996 A1   1/2008   Choi
2013/0215347 A1   8/2013   Tsukio et al.

FOREIGN PATENT DOCUMENTS

| JP | 2008-020916 A | 1/2008 |
| JP | 2014-194460 A | 10/2014 |

* cited by examiner

DESIGNED SIGN SYSTEM

TECHNICAL FIELD

The present invention relates to a designed sign system that is used as, for example, an illumination sign, an illumination advertisement, and the like which display a shop name or logo.

BACKGROUND ART

A designed light-emitting apparatus referred to as illumination sign, illumination advertisement, and the like, which clearly display a shop name or logo, has been provided in the past. A designed light-emitting apparatus like this diffuses light from a light source by a front panel to emit diffused light, thereby displays a design pattern, such as a shop name and logo, in an illuminated form. Since the designed light-emitting apparatus has high visibility and beautifulness, it is used in various places, such as the front or entrance of a brand-name shop, where the apparatus displays a brand name.

The designed light-emitting apparatus like this started as a conventional neon sign and, in recent years, has evolved into an LED sign using LEDs. And, the designed light-emitting apparatus is required to have various design properties.

For example, patent literature 1 discloses a light-emitting advertisement apparatus that, when constituting a light-emitting advertisement apparatus using light-emitting diodes, has, as an object of constituting an inexpensive and yet to offer a sense of luxury, a first display part configured by drawing a given pattern or character using a plurality of light-emitting diodes showing a plurality of colors (G, W and the like), and a second display part that arranges single-colored (red) light-emitting diodes in a matrix format, the arranged single-colored light-emitting diodes are driven and displayed in a bitmap graphic pattern to display characters by changing characters in various forms.

CITATION LIST

Patent Literatures

[PL 1] JP-A-2000-132120

SUMMARY OF THE INVENTION

Problem to be Solved by the Invention

However, since the above light-emitting advertisement apparatus includes the first display part and the second display part that have different display functions, thus an improved advertisement function is heightened, nevertheless, the light-emitting advertisement apparatus is hardly successful in conveying a sense of luxury.

The present invention has been performed in view of the above problem, and it is therefore an object of the invention to provide a designed sign system rich in design properties that can produce a sense of luxury.

Means for Solving the Problem

The present invention is a designed sign system including an image projector that projects an image composed of a still image and/or a moving image; a projection screen body that reflects the image projected from the image projector to display the image visibly; and a design part that is provided partially on a projection surface side of the projecting screen body and is formed in a shape displaying a character, a figure, or a pattern. The design part is characterized by having a translucent layer that diffusively reflects a part of light received onto a surface side and transmits the rest of the light.

Effects of the Invention

The present invention can provides a designed sign system rich in design properties that can produce a sense of luxury.

MODES FOR CARRYING OUT THE INVENTION

In what follows, an embodiment of the present invention will be described with reference to the drawings.

First Embodiment

Designed Sign System

Figure 1:
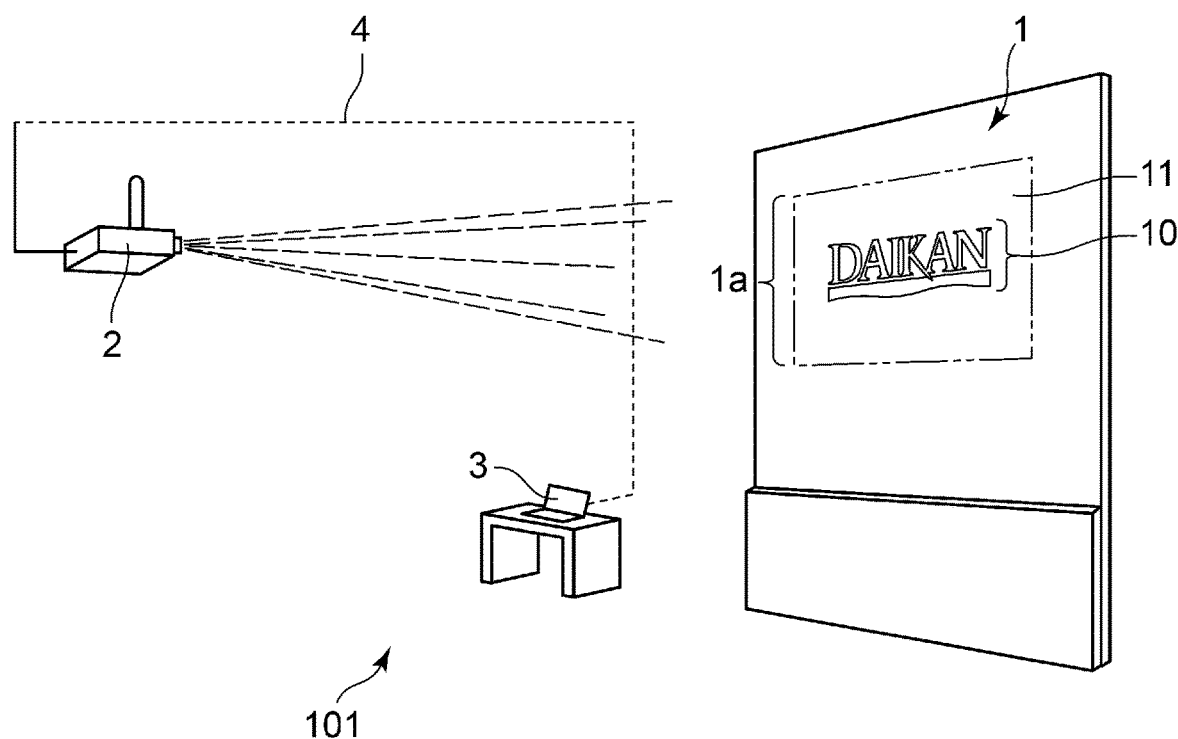
FIG. 1 is an explanatory diagram of a designed sign system.

FIG. 1 is an explanatory diagram of a designed sign system 101.

The designed sign system 101 includes a designed sign part 1, a projector 2 as an image projector, and a personal computer 3 that is a control part that controls a state of image projection by the projector 2.

The designed sign part 1 in this system is arranged on a front wall of a building, such as a shop, for an advertisement or promotion purpose so that the designed sign part 1 attracts people's attention. The designed sign part 1 includes a projection screen body 1a that is provided on the front wall surface and serves as a whole area onto which an image from the projector 2 is projected. The projection screen body 1a is composed of a design part 10 arranged on the wall surface as a solid body, and an image reflector 11 which is a part other than the design part 10 in the entire image projection area on the wall surface. The design part 10 is formed into a shape displaying a character, a figure, or a pattern. In this example, the design part 10 is formed into a shape displaying characters of "DAIKAN" and a sideline like figure below the characters simulating "a shape of wave".

The wall is set vertical. However, it may be provided as an appropriate wall, such as a sloped wall, a ceiling wall, or a floor wall. It is preferable that the wall have a plane surface, but, may be formed into an appropriate shape, such as a slightly curved surface or a spherical surface.

The designed sign part 1 is provided with, in addition to the design part 10, the projection screen body 1a that contains the design part 10 in the inside thereof. In other words, the design part 10 and the image reflector 11 that is a part of the wall surface partially provided with the design part 10 are integrated with the projection screen body 1a. This projection screen body 1a reflects an image projected from the projector 2, thus displaying the image visibly.

By the way, the designed sign part 1 may be placed on or near a wall surface, a ceiling surface, a floor surface, or an entrance or exit of a facility used by people. The designed sign part 1 may have a size that allows a person who walks by or stops near such locations of placement of the designed sign part 1 can clearly see a shape shown by the design part 10, the shape displaying a character, a figure, or a pattern.

The projector 2 is arranged at a position that is on the front surface side of the designed sign part 1 and projects obliquely on the designed sign part 1 from a direction different from on a normal line of a plane on which the designed sign part 1 is provided, distanced from the designed sign part 1. Specifically, the projection direction of the image due to the projector 2 is, with the direction matching the direction of the normal of the plane on which the designed sign part 1 is set defined as an angle 0°, constituted within a range of 5° to 60°, and more preferably within a range of 10° to 45°. This ensures a person's visual recognition of the image and proper reflection of image-carrying light at the design part 10. The projector 2 projects an image composed of a still image and/or a moving image toward the projection screen body 1a of the designed sign part 1, thereby displays the image on the projection screen body 1a.

The personal computer 3 performs control so as to transmit an image (computer graphics image) matching the solid shape of the designed sign part 1 that is created in advance using a computer, to the projector 2 via an audio/video control cable 4.

Designed Sign Part

Figure 2A:
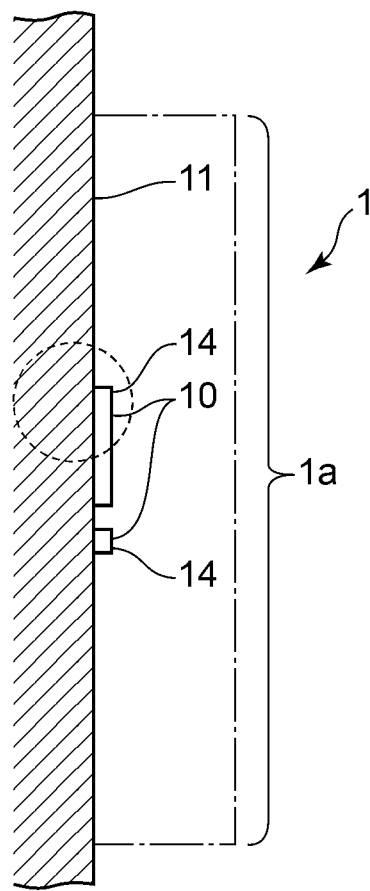
FIG. 2 is an explanatory diagram of a designed sign part.
Figure 2B:
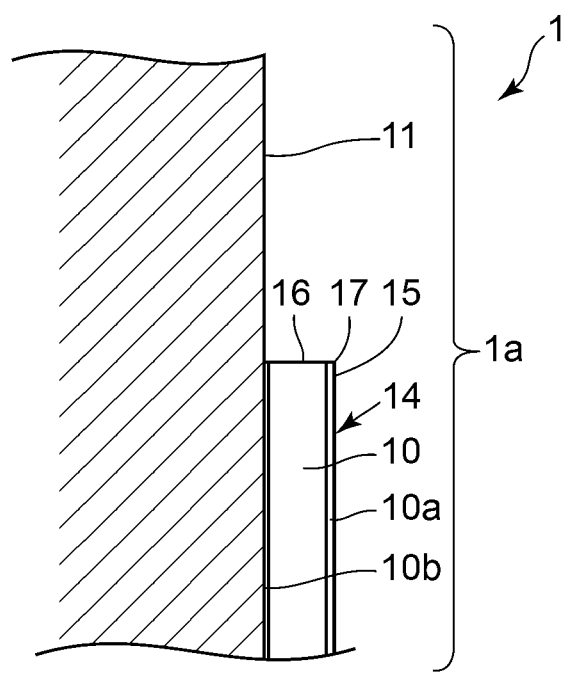

FIG. 2(A) is an explanatory diagram showing a sectional view of the designed sign part 1, and FIG. 2(B) is an explanatory diagram showing a partially expanded sectional view of the designed sign part 1.

The designed sign part 1 is constructed by providing the design part 10 on the image reflector 11 that is a part of the wall surface.

The image reflector 11 makes up a part of the projection screen body 1a. The image reflector 11 is made of an opaque material. The image reflector 11 has a plane shape in this example, but may have a solid shape. The image reflector 11 may be subjected to a texture process or a non-glare process. Such treatment suppresses projection of external light, thus reducing reflection of the appearance of a viewer himself or background scenery. It also reduces cases of light from a fluorescent lamp or the like being reflected intensely, thus allowing a projected image to be clearly displayed. In addition, light incident on the image reflector 11 subjected to a texture process or a non-glare process is diffused and is emitted in the form of soft light, which creates also a sense of luxury.

It is preferable that the projection screen body 1a is formed into a plane surface along the shape of the above wall but may be formed into an appropriate shape such as a slightly curved surface or a spherical surface. The projection screen body 1a, however, may be formed into the image reflector itself but may be formed into a screen provided by superposing on a wall surface. Anyway, the projection screen body 1a is preferable to be formed into a surface free from irregularity to an extent that a person cannot recognize the irregularity at a glance. The surface may have some roughness but is preferable to have a smooth surface.

The design part 10 is made of a transparent, colorless material, which is, in this example, a transparent, colorless acrylic material. An upper limit of a thickness of the acrylic material may be determined to be 100 mm or smaller, but is preferably 50 mm or smaller, and more preferably 10 mm or smaller. By setting like this, the transparency may be maintained. Furthermore, a lower limit of the thickness of the acrylic material may be set to 1 mm or more, and more preferably set to 2 mm or thicker. Thus, the strength may be maintained. By the way, a thickness of the acrylic material is most preferable to be 2 to 4 mm from the viewpoint he transparency and strength.

The design part 10 is made up of a plurality of objects 14. Each of the objects 14 is configured to have the same given height that is a projection amount from the image reflector 11, and to be a surface where a surface 15 is parallel with the surface of the image reflector 11.

A peripheral surface 16 of each object 14 is formed vertically to the surface of the image reflector 11 and to the surface 15 of the object 11. By the way, the peripheral surface 16 of each object 14 is, however, not limited to form a right angle like this but may be appropriately constituted into an inclined surface or a curved surface in which as the object 14 projects from a connection part of the image reflector 11, a cross-section area of a cross-section parallel with the surface 15 becomes smaller, or a stepped shape. In this process, from a viewpoint of design properties created by a sign (signboard) and design properties produced by image display, the sloped surface, the curved surface, or the vertical surface each of which includes no surface parallel with the surface 15 like the stepped surface is preferable, and the vertical surface with no slope is more preferable.

A connection part connecting between the surface 15 and the peripheral surface 16 of the object 14 is formed as a corner part 17 whose cross-section is a right angle. This corner part 17 may be formed into a shape with no right angle, by rounding the corner part 17 by providing R, or chamfering to be a plane having a predetermined angle such as 45 degrees, against the surface 15. In this process, it is preferable that the corner part 17 be formed as a right-angled corner or curved corner without chamfering into a plane surface such that the corner part 17 does not have a flat surface, and is more preferable that the corner part 17 be formed as a right-angled corner so that it does not reflect light in other directions.

By the way, the design part 10 may partially include what is different in height or surface shape in a mixed state. Even in this case, when surfaces 15 of more than a predetermined amount of objects 11 are constituted into a shape of the same corner parts 17 and the peripheral surface 16 with the same height and on the same plane, designability as a sign and designability of the image display may combined. The predetermined amount may be set to 50% or higher, more preferably to 70% or higher, and furthermore preferably to 90% or higher.

The design part 10 has a translucent layer 10a on its surface side. The translucent layer 10a is formed by providing a treatment for diffusing the reflected light due to a texture process, a frost process, or a non-glare process on the surface 15 of the design part 10 in various directions. The translucent layer 10a is therefore a layer having minute surface irregularities and a very thin layer. The surface roughness of the translucent layer 10a formed like this is preferable to be Ra 3 to 30 μm. In this configuration, the translucent layer 10a on the surface of the design part 10 diffusively reflects a part of light incident onto the surface side while transmitting the rest of the light. In addition, because the translucent layer 10a may suppress transmission of light incident from the surface side, the translucent layer 10a can be used as a screen that displays an image thereon.

The design part 10 has an opaque layer 10b on its back surface. The design part 10 is provided so as to superpose on a part of a wall surface that has the image reflector 11, via the opaque layer 10b. The opaque layer 10b reflects the rest of the light having reached through the translucent layer 10a on the surface side to the back surface. In this example, the opaque layer 10a is formed into a color different in at least one of hue, chroma, and brightness from the image reflector 11. For this reason, the light reflected from the opaque layer 10b of the design part 10 is different in color from the light reflected from the image reflector 11 on which no design part 10 is formed. This allows the shape of the design part 10 to be visually recognized clearly, therefore allows the design part 10 to attract people's attention for effective advertisement.

Projection Mapping Operation

An image (computer graphics image) matching the solid shape of the projection screen body 1a including the design part 10 is created in advance, using a computer, and is stored in the personal computer 3. The image is then transmitted to the projector 2 through control performed by the personal computer 3 (see FIG. 1).

The image transmitted to the projector 2 is projected from the projector 2 toward the projection screen body 1a.

The image projected toward the projection screen body 1a is projected with the image reflector 11 formed from an opaque material and the translucent layer 10a formed on the surface of the design part 10 as a screen.

The projected image is provided with various elaborate productions. The production include, for example, production of making people think as if the light is irradiated in all directions from the design part 10, production of making people think as if they see volcanic fumes abruptly jetting out of the center of the design part 10, production of making people think as if they see snow falling around the design part 10, production of making people think as if they see characters or the like of the design part 10 standing out three-dimensionally and changing their colors or luster or moving while changing their shapes, and production of making people think as if they see raindrops flowing down on a window glass on which the characters or the like of the design part 10 are pasted and they are watching a city's night view beyond the window glass. Such production adjusted to or utilizing the shape of the design part 10 are given to the projected image. As a result, the image displayed on the projection screen body 1a is superposed statically and/or dynamically on the shape of the design part 10, which produces an indescribable designability on the designed sign part 1. Therefore, a person who watches the designed sign part 1 is thus likely to picture in his or her mind a story triggered by the designed sign part 1, which leaves a strong impression of the designed sign part 1. In what follows, a specific explanation will be provided.

FIG. 3 is an explanatory diagram for explaining how the designed sign part 1 (projection screen body 1a) including the design part 10 is seen under environmental light (natural light or illumination light inside a facility) other than light from the projector 2 and how the designed sign part 1 is seen during the production by the projector 2.

Figure 3A:
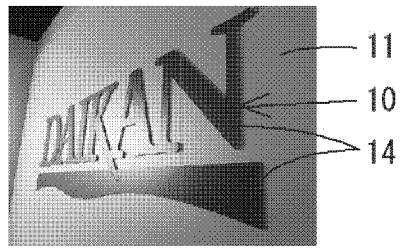
FIG. 3 is an explanatory diagram showing examples of production by the designed sign part.

FIG. 3(A) is a black-and-white photograph showing how the designed sign part 1 is seen under the environmental light only as the projector 2 is turned off. As shown in the photograph, at the characters "DAIKAN" and the wave-like design that make up the design part 10 of a solid shape with a thickness, the color (reflection light) of the opaque layer 10b on the back surface is diffused at the translucent layer 10a on the front surface. This creates a solid structure image that is seen as if the translucent layer 10a was colored with the color of the opaque layer 10b.

FIGS. 3(B) to 3(J) shows how various production is performed by reducing environmental light and projecting images from the projector 2.

Figure 3B:
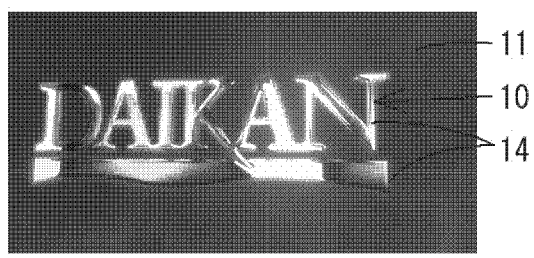

FIG. 3(B) is an example in which a solid plane image is projected so as to be seen as a metal plate chamfered into characters with their edges entirely are curved. In this case, the design part 10 has actually a shape created by cutting a tabular plate into characters with their edges not rounded but is seen as the metal plate shaped into the characters with their edges rounded. The color tone of the opaque layer 10b does not appear on the surface and is seen as if the design part 10 of color of the image is present from the beginning. This is because that the translucent layer 10a well reflects the light of the image from the projector 2. Hence people recognize the design part 10 as if there is a sign that is different in taste from a sign seen under environmental light.

Figure 3C:

FIG. 3(C) is an example in which an image of a city is projected onto the image reflector 11, a color as a sign along the shape of the design part 10 is projected to make the design part 10 look like a solid shape as it is, and an image of raindrops is projected across the image reflector 11 and the design part 10. This can produce such that as if people see a city on the other side of a glass, a solid, shining sign is provided on the glass, and raindrops hitting the glass and flowing down thereon.

Figure 3D:
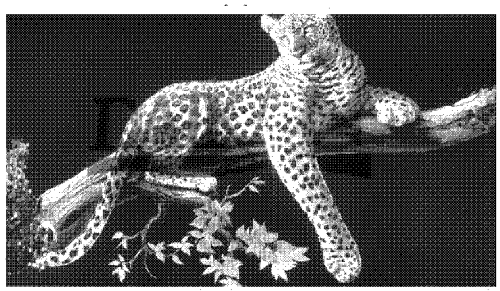

FIG. 3(D) is an example displaying a picture of a cheetah across the image reflector 11 and the design part 10. In this example, clear light-and-shade patterns covering the skin of the cheetah contribute to creation of an image that gives people an impression that the design part 10 does not exist. This effect is realized because the translucent layer 10a of the design part 10 (including the opaque layer 10b) of the design part 10 reflects light to the same extent as the image reflector 11 does.

FIGS. 3(E) to 3(J) are examples showing images in which an image starts from a recognized state (see FIG. 3(A)) as a sign of a state having no projection of the projector 2 and finally changes into a bright sign created by image projection from the projector 2.

Figure 3E:
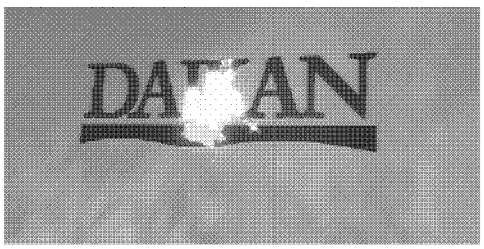

At the time of FIG. 3(E), an image is projected on the neighborhood of a central part of the design part 10 but is not projected on the surroundings of the central part. In this case, an image where the light from the projector 2 is not utterly projected on the surrounding may be formed, but, a configuration where the light the same as the environmental light, such as the white light of, for example, 50% or smaller (preferably 30% or smaller) may be projected may be formed. In this manner, production is produced so that an image appears when light hits the center of a sign that is visible under environmental light.

Figure 3F:
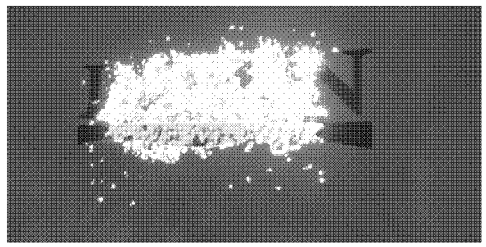
Figure 3G:

The image projected by the projector 2 spreads across over half of the design part 10, as shown in FIG. 3(F), and, then spreads further to the whole design part 10 and its vicinity, as shown in FIG. 3(G). In this process, in the vicinity of the center of the design part 10, where image projection has started first, the design part 10 is illuminated with light of a single color (in the example, DAIKAN object group is white color, and the wave-line object group is aqua) and the same brightness based on an object group unit (two object groups, i.e., the characters "DAIKAN" and possible wave-like line). As a result, production where the production of the light moves from the center toward the side, and the sign appears from its center.

Figure 3H:
Figure 3I:
Figure 3J:

An image projected by the projector 2 further moves sideways according to the production of light to expand a part where the design part 10 is illuminated as the sign, as shown in FIG. 3(H). This state proceeds to a state where the light of the single color of the object group unit is projected only on the design part 10 as shown in FIG. 3(J) via a state where most of a part that is projected as shown in FIG. 3(J) becomes a sign part of the design part 10.

The design part 10 in this sign state is different from a case where only a flat sign image is projected on a screen. The design part 10 is recognized so as to stand out toward the viewer's side to an extent equivalent to the thickness of the design part 10, thus being recognized as a solid sign.

According to the above configurations and operations, the design part 10 is formed into a shape that is arranged on a part of the projection surface side of the projection screen body 1a and displays a character, a figure, or a pattern, and has a translucent layer 10a that diffusively reflects a part of light received on the surface side while transmitting the rest of the light. The design part 10 configured in this manner thus functions as a screen having a predetermined contour shape. As a result, even when the projector 2 (image projector) projects no image, the design part 10 works as the designed sign part 1 to exert an advertisement function as the designed sign part 1. When the projector 2 projects an image, the designed sign part 1 including the design part 10 and the projection screen body 1a then exerts the advertisement function. These processes allow rich design expressions using an image and an impressive advertisement with a high production effect can be performed.

The translucent layer 10a is a layer formed by applying a frosting process, a texture process, or a non-glare process on a surface of a transparent body. The translucent layer 10a therefore hardly allows projection of natural light on the translucent layer 10a. In addition, light reflected by the translucent layer 10a comes out as soft light, which creates a sense of luxury.

On a back surface side of the design part 10, an opaque layer 10b that reflects remaining light transmitted through a translucent layer 10a on a front surface side is formed. Then, the opaque layer 10b is constituted in a color different at least in one of hue, chroma, and brightness from the image reflector 11 constituting the projection screen body 1a. Therefore, the design part 10 may be stood out from the image reflector 11, and publicizing, advertising effect may be heightened.

The projection screen body 1a and the design part 10 have a magnitude that, when installed on a wall surface, a ceiling surface, a floor surface, an entrance or in the neighborhood of these of facilities used by people, a person who passes by or stops walking the neighborhood of an installed position is capable of clearly recognizing a shape represented by a character, a drawing, or a pattern represented by the design part 10. Therefore, it is eye-catching. One scene displayed on the screen of a motion picture can be can be vividly remembered, and makes high entertainment property that simple advertising board lacks feel.

EXAMPLE 2

<Designed Sign System of Example 2>

Figure 4:
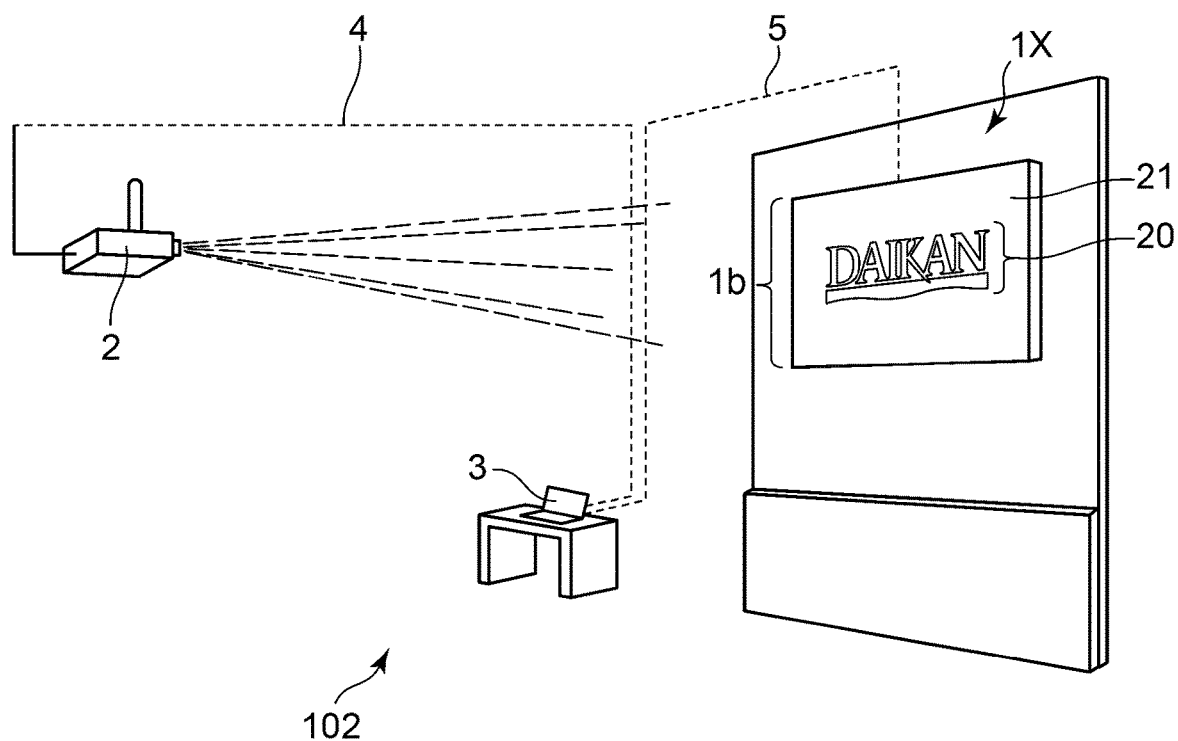
FIG. 4 is an explanatory diagram of a designed sign system according to a second embodiment.

FIG. 4 is an explanatory figure of a designed sign system 102 of Example 2. The designed sign system 102 of Example 2 is provided with a designed light-emitting apparatus 1X as a deigned sign part, a projector 2 as an image projection part, and a personal computer 3 as a control part for controlling a light emission state due to the designed light-emitting apparatus 1X and an image projection state due to the projector 2.

The designed light-emitting apparatus 1X is a LED signboard or the like that shops and so on install on fronts of their buildings for publishing or advertising so as to catch eyes of passengers. The designed light-emitting apparatus 1X is provided with a solid light diffusion design part 20 (corresponding to "design part 10" in Example 1) for diffusing light from the incorporated LED light source. In this example, in a front view, the light diffusion design part 20 is formed into a shape representing a character of "DAI-KAN" and a sideline-like drawing under the related character simulating "a wave form". By the way, relationship of both such as a point or the like such as a front surface of the light diffusion design part 20 and a front surface of a chassis 21 are formed in parallel can be set the same as the relationship between a front surface 15 of an object 14 and the image reflector 11 in Example 1. Furthermore, a shape of a peripheral surface or angles of the light diffusion design part 20 may be set the same as a shape of a peripheral surface 16 or the corner part 17 of the object 14 of Example 1.

The designed light-emitting apparatus 1X is connected to a personal computer 3 by a light-emitting control cable 5, and the personal computer 3 performs on-off control and dimming control of the LED light source incorporated in the designed light-emitting apparatus 1X.

The personal computer 3 is connected also to the projector 2 via an image and audio control cable 4.

The personal computer 3 controls such that an image (computer graphics) matching with a three dimensional shape of the designed light-emitting apparatus 1X containing the light diffusion design part 20 prepared in advance with the computer is transferred to the projector 2 via the image audio control cable 4.

The projector 2 is installed by separating on a front surface side of the designed light-emitting apparatus 1X, and, with the designed light-emitting apparatus 1X as a screen, an image (computer graphics) matching with a three-dimensional shape of the designed light-emitting apparatus 1X incorporating the light diffusion design part 20 is projected. That is, the designed light-emitting apparatus 1X works as a projection screen body 1b, and the image projected from the projector 2 is reflected and is displayed recognizably.

<Designed Light-Emitting Apparatus>

Figure 5:
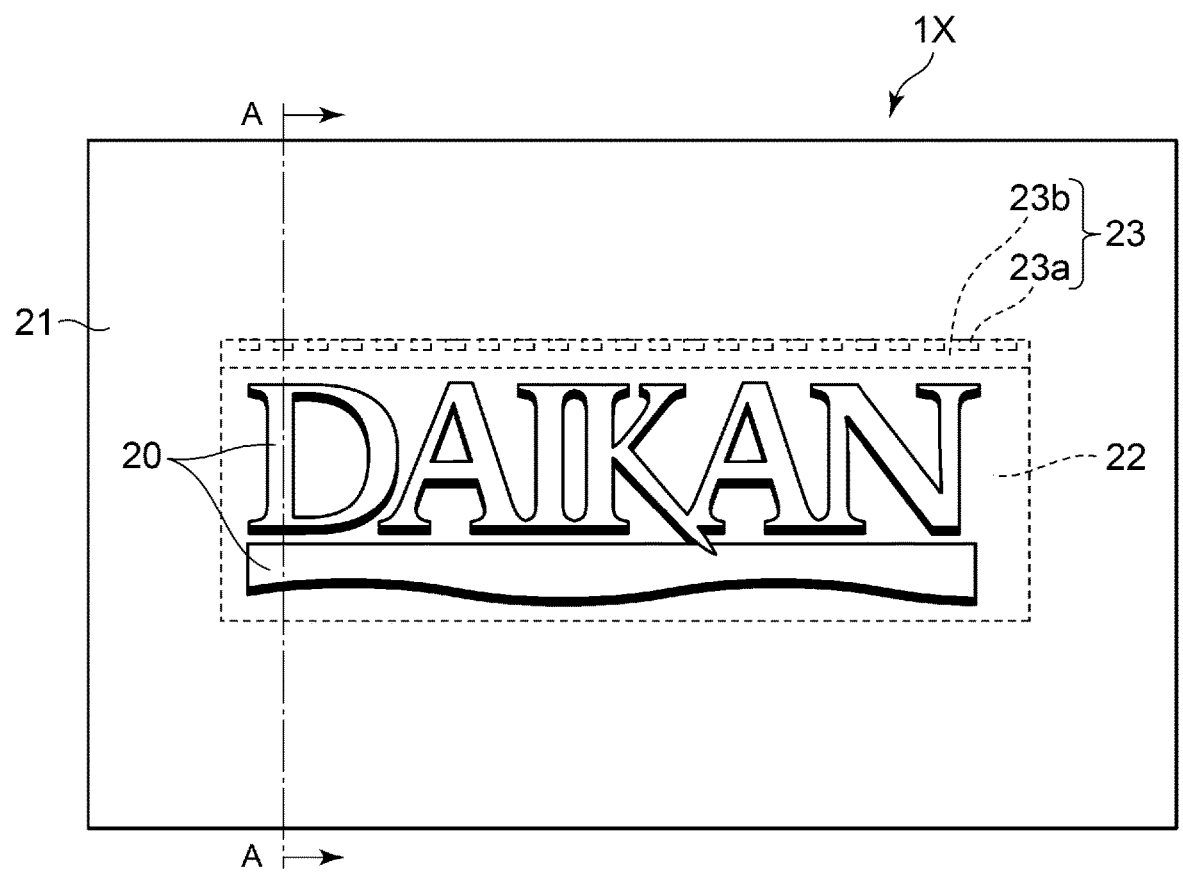
FIG. 5 is an explanatory diagram due to a front part of the designed sign part according to the second embodiment.

FIG. 5 is an explanatory diagram due to a front view of a designed sign part 1 (designed light-emitting apparatus 1X) of Example 2.

Figure 6A:
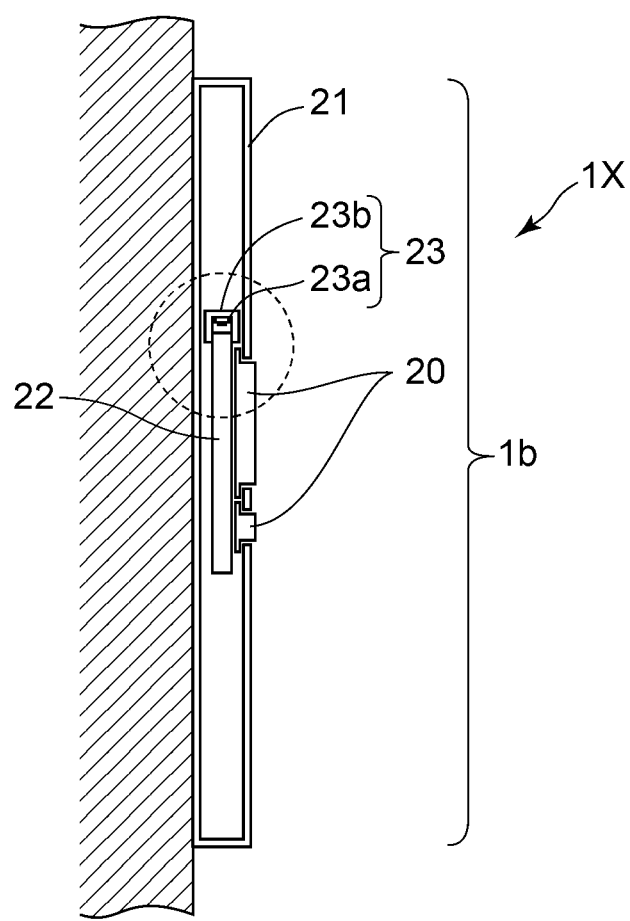
FIG. 6 is an explanatory diagram of the designed sign part according to the second embodiment.
Figure 6B:
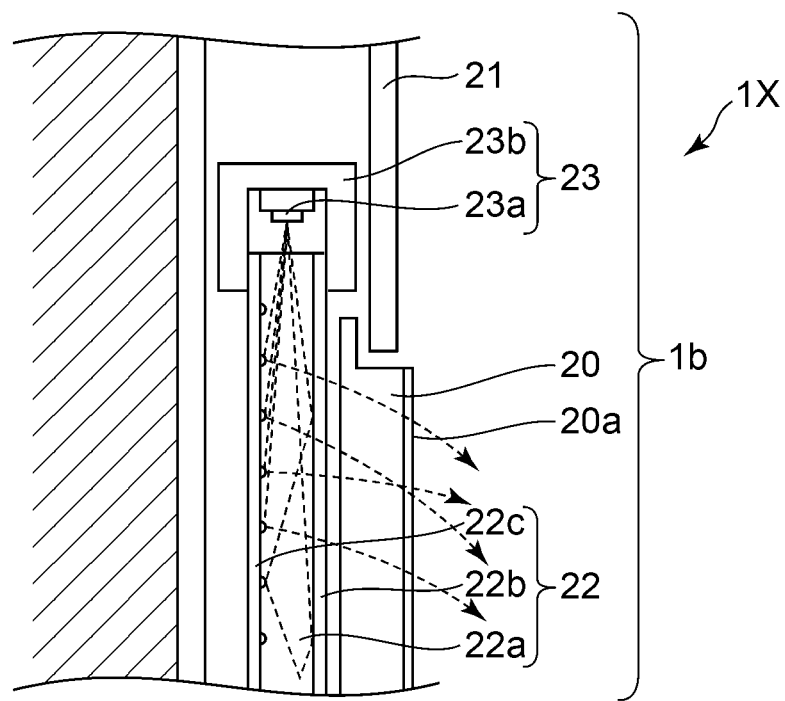

FIG. 6(A) is an explanatory diagram due to an A-A cross-sectional view of a designed sign part 1 (designed light-emitting apparatus 1X) in FIG. 5, and FIG. 6(B) is an explanatory diagram due to a partially enlarged cross-sectional view of the designed sign part 1 (designed light-emitting apparatus 1X).

The designed light-emitting apparatus 1X is provided with, in a front view, the light diffusion design part 20 formed into a shape displaying characters or the like and a chassis 21 (corresponding to the image reflector 11 of Example 1) having an opening along the shape of the light diffusion design part 20.

Then, the designed light-emitting apparatus 1X is provided with an LED light guide plate 22 on a back surface side of the light diffusion design part 20, furthermore provided with an LED module 23 on one end surface of the LED light guide plate 22, and these are supported by the chassis 21.

The chassis 21 is formed of an opaque material, and, in this example, an aluminum material is used. The chassis 21 is, in this example, a tabular shape, but may have a solid shape. A surface of the chassis 21 may be provided with a texture process. Thus, reflection of incident light may be reduced. Furthermore, since light incident on a texture processed surface is diffused and emitted as soft light, luxury feeling may be exhibited.

The light diffusion design part 20 (transparent body) is formed of a transparent material, in the example, an acrylic material is used. A thickness of the acrylic material is preferable to be 10 mm or smaller from a viewpoint of transparency, preferable to be 1 mm or larger from the viewpoint of strength, and preferable to be 2 to 4 m from the practical point of view.

The light diffusion design part 20 has a translucent layer 20a on a surface. The translucent layer 20a is formed by applying a texture process or a frost process on a surface of the light diffusion design part 20. Therefore, the translucent layer 20a is a layer having fine irregular layer on a surface, and is a very thin layer. Surface roughness Ra of thus formed translucent layer 20a is preferable to be 3 to 20 μm. Thereby, the translucent layer 20a on a surface of the light diffusion design part 20 can convert incident light into diffused soft light and can emit, thereby, luxury feeling may be shown. Furthermore, since the translucent layer 20a may suppress the transmission of incident light, the translucent layer 20a may be used as a screen to display image or the like.

The light diffusion design part 20 may be colored on a back surface, or, gradation where the color is continuously varied relative to a position may be applied.

The LED light guide plate 22 is provided on a back surface side of the light diffusion design part 20.

The LED light guide plate 22 has a light guide plate body 222a, a diffusion sheet 22b adhered on a front surface of the light guide plate body 222a, and a reflection sheet 22c adhered on a back surface of the light guide plate body 22a.

The light guide plate body 22a is formed of a transparent acrylic material. The light guide plate body 22a has a thickness preferably of 2 to 8 mm, and more preferably 5 mm. The light guide plate body 22a has a dot or a V groove laser processed on a back surface.

A reflection sheet 22c adhered on the back surface of the light guide plate body 22a has, in this example, a thickness of 1 mm.

The diffusion sheet 22b adhered on the front surface of the light guide plate body 22a is, in this example, a milk half plate having a thickness of 2 mm and makes a surface uniformly emit light by diffusing incident light.

The LED light guide plate 22 is arranged such that the light diffusion sheet 22b faces a back surface of the light diffusion design part 20. And, the LED light guide plate 22 covers all of a back surface of at least the light diffusion design part 20.

The LED module 23 is provided on one end surface of the LED light guide plate 22, in this example, on an upper end surface. The LED module 23 may be provided on any of left-right and back-down end surface of the LED light guide plate 22, or, may be provided in plurality.

In the LED module 23, a plurality of LED light sources 23a are installed in a reflector 23b having a U-shaped or Japanese character "⊐" shaped cross-section in which a surface that is long-sized along an upper end surface of the LED light guide plate 22 and faces the upper end surface of the LED light guide plate 22 is opened. The plurality of LED light sources 23a are arranged in a row with substantially equal distance apart along an upper end surface of the LED light guide plate 22, and a light-emitting surface is arranged in a direction where the light-emitting surface faces the upper end surface of the LED light guide plate 22.

To the LED module 23, an AC adaptor (not shown) with a control terminal is connected, and DC power can be supplied. Furthermore, to the control terminal of the AC adaptor (not shown), a light emission control cable 5 is connected, and on-off and dimming control of the LED light source 23a due to the personal computer 3 is made possible.

<Light Emission Operation>

The LED light source 23a emits light by control of the personal computer 3.

The light emitted from the LED light source 23a enters in the light guide plate body 22a from an upper end surface of the LED light guide plate 22 (see FIG. 6(B)).

Light entered in the light guide body 22a spreads in the inside of the light guide plate body 22a while repeating surface reflection and scattering due to the dots and the V groove.

The light spread inside of the light guide plate body 22a is scattered by the diffusion sheet 22b to be uniform surface emission light.

The light that became uniform surface emission light enters from a back surface of the light diffusion design part 20 facing the diffusion sheet 22b, and proceeds toward a surface of the light diffusion design part 20.

The light of the uniform surface emission light reached a surface of the light diffusion design part 20 is diffused by the translucent layer 20a to be soft light and is emitted from the light diffusion design part 20.

<Projection Mapping Operation>

The light emission from the LED light source 23a is stopped by a control of the personal computer 3.

An image (computer graphics) matching a solid shape of the designed light-emitting apparatus 1X (projection screen body 1b) including the light diffusion design part 20 housed in the personal computer 3 prepared in advance with the computer is transmitted to the projector 2 (see FIG. 4) by the control of the personal computer 3.

The image (computer graphics) transmitted to the projector 2 is projected from the projector 2 toward the designed light-emitting apparatus 1X.

The image (computer graphics) projected toward the designed light-emitting apparatus 1X is projected on the designed light-emitting apparatus 1X with a surface of the designed light-emitting apparatus 1X of which surface is covered with the chassis 21 formed of an opaque material and the light diffusion design part 20 having the translucent layer 20a as a screen.

FIG. 7 is an explanatory diagram for explaining how the designed light emission apparatus 1X (projection screen body 1b) including the diffusion design part 20 is seen by the emission of the LED light source 23a and how it is seen during the production due to the projector 2.

Figure 7A:
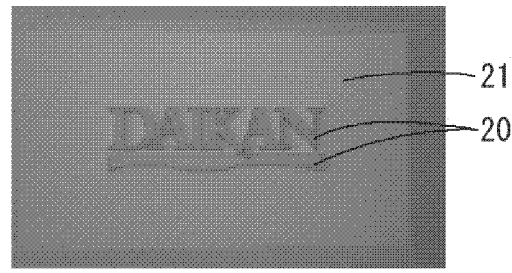
FIG. 7 is an explanatory diagram showing examples of production by the designed design part according to the second embodiment.

FIG. 7(A) shows a monochromatic photograph when white light is projected over an entire range of projection from the projector 2. As shown in the photograph, it is found that a surface of the light diffusion design part 20 projects on a front side than a surface of the chassis 21, but, since the light diffusion design part 20 has a color the same as the chassis 21, it does not stand out.

Figure 7B:
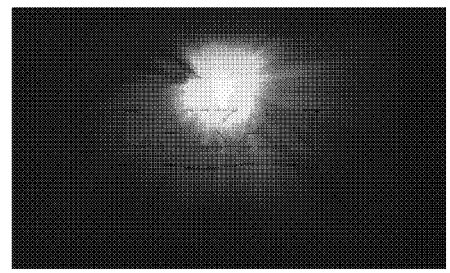

FIG. 7(B) shows how both of the light diffusion design part 20 and the chassis 21 are seen when an image striding on both of the light diffusion design part 20 and the chassis 21 is projected from the projector 2. As shown in the Figure, although the existence of the light diffusion design part 20 can be seen, it does not so much stands out, and it can be produced due to an image.

Figure 7C:

FIG. 7(C) shows how both of the light diffusion design part 20 and the chassis 21 are seen when an image or light different from each other of both of the light diffusion design part 20 and the chassis 21 is projected from the projector 2. As shown in the Figure, the light diffusion design part 20 is clearly recognized like a shining sign, and, a video (image) different from the light diffusion design part 20 is projected on the chassis 21. In the shown example, production such that on a wall having a pattern, the light diffusion design part 20 is provided as a light-emitting sign, and, a spot light strikes its center to make a pattern of the wall in the surrounding of the light diffusion design part 20 seen is obtained.

Figure 7D:
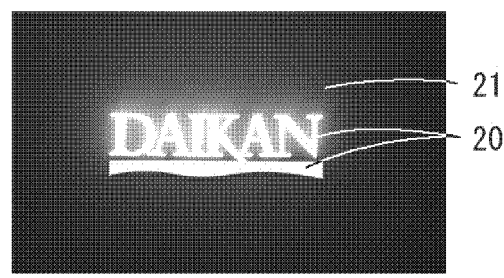

FIG. 7(D) shows a state in which the projector 2 is turned off without projecting, the LED light source 23a (see FIG. 6) is emitted to make the light diffusion design part 20 recognize as a light-emitting sign. Compared with the case where the projector 2 projects light (or image) from outside to make emit light, the light diffusion design part 20 is made to directly emit light to make emit light more brighter so as to be recognized more clearly even from afar.

Due to a configuration and an operation described above, the light diffusion design part 20 has a translucent layer 20a on a front surface side. Therefore, light emitted from the LED light source 23a transmits the translucent layer 20a and is irradiated from the light diffusion design part 20. Thus, the light emitted after transmitting the translucent layer 20a is not only bright but also exhibits luxury feeling. Furthermore, the light emitted from the LED light source 23a is diffused when passing through the translucent layer 20a and is emitted as soft light.

The translucent layer 20a on a front surface side of the light diffusion design part 20 does not transmit all light, but has directionality and refractive index appropriate to the screen that displays an image. Therefore, the translucent layer 20a of the light diffusion design part 20 can exhibit a function as a screen during projection mapping. Furthermore, the translucent layer 20a is a very thin layer formed on a surface of the light diffusion design part 20. Therefore, when it is used as a screen, it is difficult to generate blur of the image in a depth direction.

The translucent layer 20a is formed by applying the texture process, a frost process, or a non-glare process on a surface of the light diffusion design part 20. Therefore, the translucent layer 20a is a layer having fine irregularity, and, corners of the irregularity is rounded. Thus, the diffusion by the translucent layer 20a of the light emitted from the LED light source 23a tends to be uniform in all direction, and the light emitted from the light diffusion design part 20 becomes less stinging.

Furthermore, when the translucent layer 20a like this is used as a screen for the projection mapping, since the translucent layer 20a does not locally show peculiar directivity and the reflectivity, the image displayed on a surface of the light diffusion design part 20 becomes uniform over an entire surface. Furthermore, by adjusting the transmittance of the translucent layer 20a, the image may be made to be seen through in a space of the light diffusion design part 20, thereby fantastic and dreamy atmosphere may be created.

Industrial Applicability

The present invention may be utilized in an industry of lighting sign or lighting advertisement of shop names and logos.

EXPLANATION OF SIGNS

1 . . . designed sign part
1a, 1b . . . projection screen body
1X . . . designed light-emitting apparatus
2 . . . projector
3 . . . personal computer
10 . . . design part
10a . . . translucent layer
10b . . . opaque layer
11 . . . image reflection part
20 . . . light diffusion design part
21 . . . chassis
22 . . . LED light guide plate
23 . . . LED module
23a . . . LED light source
101, 102 . . . designed sign system

The invention claimed is:

1. A designed sign system comprising:
an image projection part for projecting an image constituted of a still image and/or a dynamic video;
a projection screen body for displaying recognizably by reflecting the image projected from the image projection part; and
a design part formed in a shape for displaying a character, a figure, or a pattern by partially providing on a projection surface side of the projection screen body; wherein
the design part includes:
a translucent layer that diffuses a part of light received on a front surface side and transmits a remaining light to a back surface side,
an opaque layer that reflects the transmitted remaining light to the back surface side, the opaque layer is of a color different in at least one of hue, chroma, and brightness from the projection screen body.

2. The designed sign system according to claim 1, wherein the translucent layer is a layer formed by applying a process selected from the group consisting of a frost process, a texture process, and a non-glare process on a surface of a light transmission body.

3. The designed sign system according to claim 1, wherein the projection screen body and the design part are configured so that, when installed on a wall surface, a ceiling surface, a floor surface, an entrance or in a neighborhood of these of facilities used by people, a person who passes by or stops when walking in the neighborhood of an installed position is capable of clearly recognizing a shape represented by a character, a drawing, or a pattern represented by the design part.

4. A designed sign production method that uses the designed sign system according to claim 1, the method comprising:
executing a production mode comprising switching between:
a non-light-emitting sign mode that does not perform projection from the image projection part;
a light sign mode where an image or light is projected on the design part from the image projection part and the light and image are not projected on a part other than the above; and an image production mode that produces by projecting the image on an entire projection screen body including the design part and a part other than the above by the image projection part.

5. A designed sign system, comprising:
an image projection part for projecting an image constituted of a still image and/or a dynamic video;
a projection screen body for displaying recognizably by reflecting the image projected from the image projection part;
a design part formed in a shape for displaying a character, a figure, or a pattern by partially providing on a projection surface side of the projection screen body;
a light source for irradiating light on the design part from a back surface side, and
a control part that controls a light-emission state of the light source for the design part, and an image projection state due to the image projector, wherein
the design part includes:
a translucent layer that diffuses a part of light received on a front surface side and transmits a remaining light to the back surface side.

* * * * *